Dec. 1, 1970  A. A. KAUL  3,543,606
ACCELERATOR PEDAL ATTACHMENT
Filed July 15, 1968  2 Sheets-Sheet 1
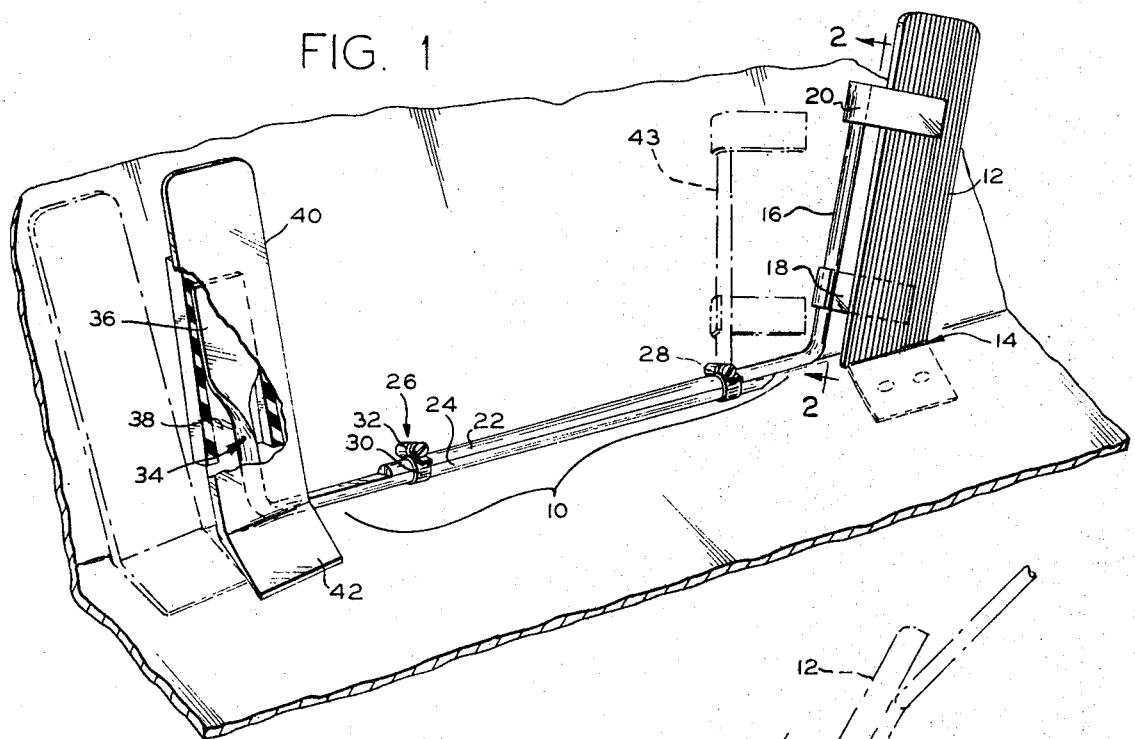
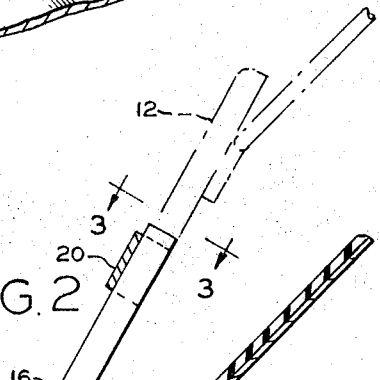
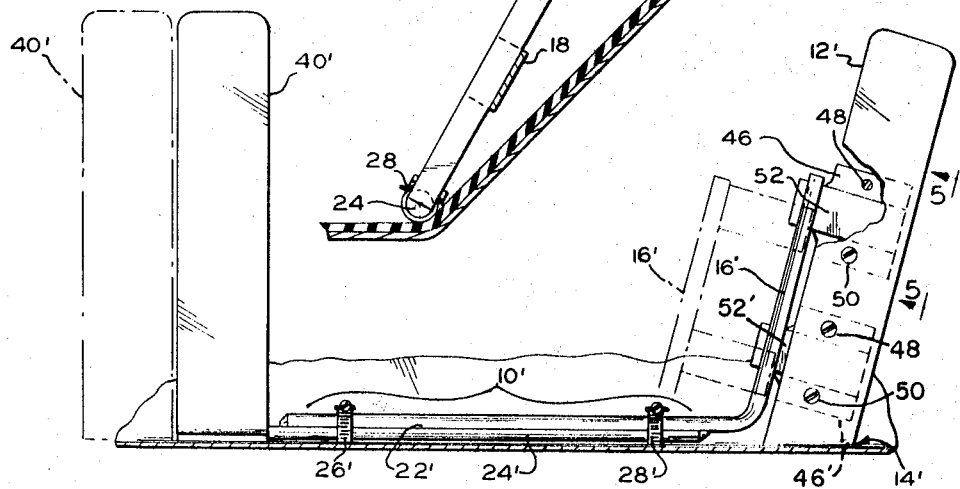
ARTHUR A. KAUL
INVENTOR
BY
BUCKHORN, BLORE, KLARQUIST & SPARKMAN
ATTORNEYS Dec. 1, 1970  A. A. KAUL  3,543,606
ACCELERATOR PEDAL ATTACHMENT
Filed July 15, 1968  2 Sheets-Sheet 2
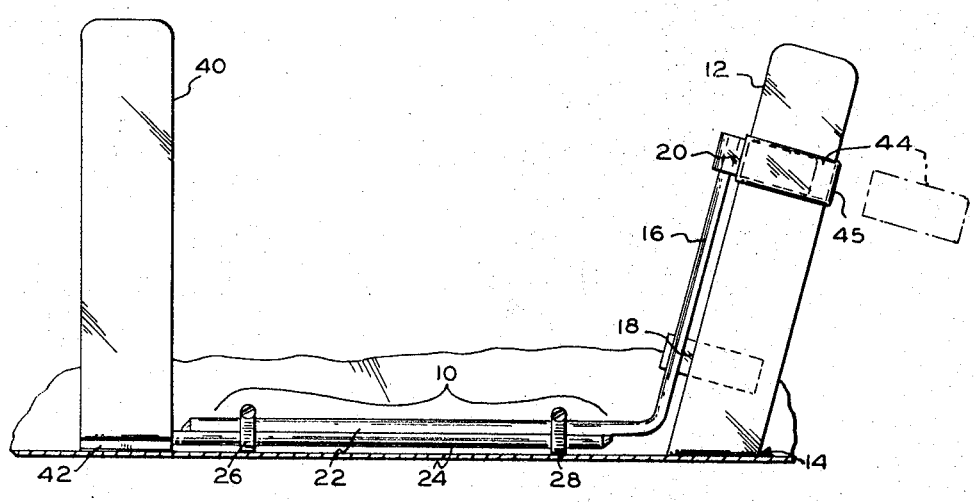
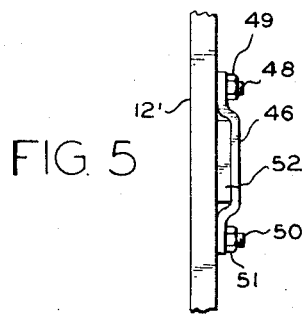
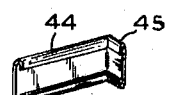
ARTHUR A. KAUL
INVENTOR
BY
BUCKHORN, BLORE, KLARQUIST & SPARKMAN
ATTORNEYS United States Patent Office 3,543,606
Patented Dec. 1, 1970

3,543,606
ACCELERATOR PEDAL ATTACHMENT
Arthur A. Kaul, Chehalis, Wash. 98532
Filed July 15, 1968, Ser. No. 744,867
Int. Cl. G05g 1/16
U.S. Cl. 74—562.5                                7 Claims

ABSTRACT OF THE DISCLOSURE

An auxiliary accelerator pedal attachment comprises a transverse shaft member, adapted for resting along an automobile floor board next to the automobile accelerator pedal, and an upward angular extension thereof positioned proximate the left hand side of the automobile accelerator pedal. The upward angular extension is provided with one or more transverse tabs which are slidably engageable with the vehicle's accelerator pedal, and the remaining end of the attachment suitably supports an auxiliary accelerator pedal. Movement of the auxiliary accelerator pedal forces a tab against the vehicle's accelerator pedal for positioning the same. The attachment is not secured to the vehicle's accelerating apparatus, but rests upon the automobile floor board and upon the automobile's accelerator pedal of its own weight. Therefore, no installation is required, and moreover, the attachment can be easily removed out of the way when use thereof is not desired.

BACKGROUND OF THE INVENTION

A number of auxiliary accelerator pedal attachments for automobiles have heretofore been proposed for use in relieving fatigue of the automobile operator who must remain behind the wheel for an extended period of time. An auxiliary attachment conveniently comprises a left-hand accelerator pedal connected through a linkage to the automobile's conventional accelerator mechanism. The driver may then depress the left-hand accelerator pedal with his left foot for resting his right, while also leaving the right foot free to operate the vehicle's brakes should the need so arise.

Unfortunately, many auxiliary pedal arrangements require permanent or semi-permanent installation within the vehicle. Usually the mechanism must be secured to the automobile floor board in some way, and also to the automobile's regular accelerator pedal. Not only does such an installation add to the eventual cost of the attachment, but in many instances there is no need for permanent installation of an auxiliary pedal attachment. For example, it may remain unused on short trips or when another operator is driving the vehicle.

SUMMARY OF THE INVENTION

According to the present invention, an auxiliary accelerator attachment requires no permanent installation in the vehicle with which it is to be used. Rather, the attachment rests mainly by its own weight upon the floor board of the vehicle while at the same time fully engaging the vehicle's accelerator pedal mechanism. The attachment includes a transverse shaft member to which an auxiliary pedal is attached and which carries an upward angular extension for positioning along the left-hand side of the vehicle's regular accelerator pedal. This extension carries one or more, and preferably two, transverse tabs which are slidably engageable with the vehicle's accelerator pedal, permitting the attachment to be installed or removed at will.

According to a preferred embodiment of the present invention, the aforementioned upward angular extension carries a pair of transverse tabs slidably overlaying the front and rear surfaces of the accelerator pedal. The tab overlaying the upper surface is disposed farther from the aforementioned transverse shaft portion than the tab overlaying the rear of the vehicle's accelerator pedal. The rear tab thereby acts to hold the attachment in place so that it does not move forward away from the vehicle's accelerator pedal, while the upper tab is employed in applying pressure to the vehicle's accelerator pedal.

It is accordingly an object of the present invention to provide an improved auxiliary accelerator attachment for an automobile or other vehicle which is simply manufactured and easily installed in a vehicle.

It is a further object of the present invention to provide an improved auxiliary accelerator attachment for an automobile or other vehicle which is easily installed in such vehicle and readily removed therefrom without requiring tools of any kind for substantially instantaneous installation and removal from the vehicle.

It is another object of the present invention to provide an auxiliarly accelerator attachment for an automobile or other vehicle which requires no mechanical installation, and which rests in position of its own weight.

It is a further object of the present invention to provide an improved auxiliary accelerator attachment for an automobile or other vehicle which may readily be disengaged from the vehicle's accelerator mechanism by the vehicle's operator while the vehicle is being driven.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view, partially broken away, of an auxiliary accelerator attachment according to one embodiment of the present invention;

FIG. 2 is a side view, partially in cross section, of a vehicle accelerator pedal and the attachment according to the present invention, the view being taken at 2—2 in FIG. 1;

FIG. 3 is a top view of an upward extension portion of an accelerator attachment according to the present invention as taken at 3—3 in FIG. 2;

FIG. 4 is a front view, partially broken away, of an alternative embodiment of an auxiliary accelerator attachment according to the present invention;

FIG. 5 is a side view of a vehicle accelerator pedal, and a portion of the alternative auxiliary accelerator attachment, the view being taken at 5—5 in FIG. 4;

FIG. 6 is a front view of an auxiliary accelerator attachment according to one embodiment of the present invention, employing a removable hooked sleeve; and FIG. 7 is a perspective illustration of such removable hooked sleeve.

DETAILED DESCRIPTION

Referring to FIGS. 1 through 3 of the drawings, an accelerator attachment includes an elongated shaft member 10 positionable on the floor board or floor board covering of an automobile or other vehicle to the left of the vehicle's usual accelerator pedal 12. The shaft member 10 is desirably disposed approximately in parallel relation with the turning axis of the accelerator pedal 12, for example, in alignment with an articulated connection indicated at 14, between the angularly movable accelerator pedal 12 and the horizontal floor board. The shaft member 10 extends transversely to the left of the accelerator pedal 12 along the corner formed between the horizontal floor board and the portion of the floor board or fire wall extending angularly upward and toward the front of the vehicle. It is noted that the shaft member 10 is not permanently attached to the vehicle, but rather rests of its own weight upon the floorboard, being held in position as hereinafter more fully described.

The shaft member 10 is provided with an upward angular extension 16 which may comprise a continuation of the shaft member suitably formed or bent to the desired angle. Upward angular extension 16 is thereby adapted for positioning proximate the left-hand side of the vehicle accelerator pedal 12. In the FIG. 1 embodiment the upward extension is provided with a pair of transverse tabs 18 and 20 directed to the right of the extension for slidably overlaying a part of the front and rear surfaces of accelerator pedal 12. The tabs extend substantially perpendicularly from extension 16. A first lower tab 18 suitably comprises a metal plate extending to the rearward side of pedal 12, while upper tab 20, which is farther from shaft member 10 than tab 18, suitably comprises a metal plate extending over the front or upper surface of the accelerator pedal 12. The upward extension 16 is suitably a half-round steel bar having a diameter slightly greater than the thicknes of the usual accelerator pedal. Tabs 18 and 20 may then be formed of narrow steel plates which are bent at one end to conform with the rounded portions of extension 16, and the tabs are welded to extension 16. The tabs are also desirably positioned far enough apart on extension 16 so that the accelerator pedal 12 is very easily inserted therebetween.

Shaft member 10 comprises a pair of half-cylindrical steel bar portions 22 and 24 having their flat longitudinal sides disposed in overlapping engagement. It will be observed that extension 16 is suitably unitary with portion 22. Clamping means 26 and 28 are conveniently positioned around the cylindrical exteriors of portions 22 and 24 and tightened to hold these portions together for completing rigid shaft member 10. These clamping means advantageously comprise commercially available cable clamps formed of steel strap 30 and including an adjusting screw or worm 32 for tightening or loosening the clamping action of the steel strap. Shaft member 10 may be extended or shortened by merely loosening these clamps and then tightening the same once more after a desired adjustment.

Left-hand portion 24 of shaft member 10 is provided with left-hand accelerator member 34 extending angularly upward from the transverse direction of shaft member 10. Again, this left-hand accelerator member suitably forms an extension of the shaft member 10. In particular, portion 24 of member 10 may be bent to the correct angular position to provide the upwardly extending left-hand accelerator member 34. The upwardmost portion of the left-hand accelerator member 34 is desirably flattened to form a spade portion 36 which may be employed if desired as a left-hand accelerator pedal. However, spade portion 36 is preferably received within a longitudinal internal channel 38 in a left-hand accelerator pedal 40. Left-hand accelerator pedal 40 is desirably formed of rubber or plastic and also includes a lower skirt or pad 42 articulately connected to pedal 40. Skirt or pad 42 rests upon the vehicle floor board or covering. Spade 36 is closely received within channel 38 whereby the pedal 40 is held in a desirably upright position thereby, and at approximately the same forward angle as accelerator pedal 12. Adjustment of the length of shaft member 10 employing clamping means 26 and 28 transversely locates the position of pedal 40.

To install the accelerator attachment according to the present invention, the shaft member 10 is placed at the left of a vehicle accelerator pedal along the forward corner of the vehicle floor board, and the whole attachment is slid to the right with tabs 18 and 20 slidably engaging the rear and front surfaces respectively of the vehicle's accelerator pedal 12. The auxiliary pedal 40 may then be depressed whereby shaft member 10 is rotated about its axis producing a torque for depressing the vehicle's accelerator pedal 12. Lower tab 18 holds the attachment in place, that is, tab 18 holds the attachment so that it does not move forward from the above described position, while upper tab 20 is effective for depressing the accelerator pedal 12. It is observed that the attachment thus rests in position upon the floorboard and the accelerator pedal of its own weight, for producing effective engagement and operation of the vehicle's accelerator pedal. In practice the attachment has little tendency to become disengaged therefrom, e.g. because of the direct weight of the attachment on the accelerator pedal and the friction between tab 20 and the pedal. The occasional pressure of the driver's left foot on the left-hand accelerator pedal 40 also tends to retain the left-hand portion of the attachment in the illustrated position. However, when the employment of the attachment is to be discontinued, it may be simply slid to the left with tabs 18 and 20 easily moving out of operating engagement with pedal 12. The vehicle operator may simply kick the attachment out of the way by kicking pedal 40 to the left, even while the vehicle is in operation, that is, without the operator having to move from his usual driving position. Obviously, no cumbersome installation or removal procedures are required for the attachment according to the present invention.

FIG. 7 illustrates a hooked sleeve 44 which may be slidably received onto one of the tabs 18 or 20, and FIG. 6 illustrates an accelerator attachment with sleeve 44 in place upon tab 20. The sleeve is suitably formed of sheet metal turned under at the sides to provide a channel for receiving such a tab, and one end of the resulting sleeve is crimped and bent to form hook 45. The sleeve is dimensioned such that it fits tightly over tab 20, and may further be secured in position on the tab with a hand punch or awl employed to indent the sleeve and tab thereunder whereby to more permanently hold the sleeve in position. The hook 45 is positioned so that it extends toward the vehicle's accelerator pedal, and, when in position, the hook 45 engages the right-hand side of the vehicle's accelerator pedal 12 and prevents the attachment from sliding to the left. It is understood that this sleeve is not essential to the employment of the present invention, and use thereof may not be desirable when quick removal of the accelerator attachment is desired as by kicking it out of the way. However, the hooked sleeve is suitable in those instances where a somewhat more permanent installation is preferred. It should be noted that even with the hooked sleeve still in place, no mechanical installation of the attachment is required. The attachment again resides in place by its own weight. The tabs are again inserted on either side of the accelerator pedal, after which the attachment is allowed to turn toward the accelerator pedal with tab 20 engaging the upper surface thereof, and tab 18 engaging the lower surface thereof. To remove the attachment including a hooked sleeve, pedal 40 is moved away from the floor before the attachment is slid to the left.

FIGS. 4 and 5 illustrate an alternative embodiment of the present invention wherein similar elements are referred to by primed reference numerals. According to this embodiment, one or more brackets 46 and 46' are secured to the rear of the vehicle accelerator pedal 12' by means of flat headed machine screws 48 and 50 received in matching countersunk holes in accelerator pedal 12'. Nuts 49 and 51 hold the brackets to the accelerator pedal. Each bracket provides a channel to slidably receive a tab 52 or 52' extending transversely from extension 16', wherein tabs 52 and 52' suitably comprise narrow metal plates welded to the rear of extension 16' and extending perpendicularly therefrom. The attachment is engaged with the vehicle accelerator pedal by moving the attachment to the right such that the tabs are received within brackets 46 and 46'. Again, the attachment, including shaft member 10' and left-hand accelerator pedal 40', is easily positioned in place, and removed at will. The embodiment of FIGS. 4 and 5 requires the installation of one or more brackets 46 and/or 46' behind the accelerator pedal, but the presence of a tab on the forward side of the accelerator pedal is avoided.

It is preferred that a pair of tabs be employed in the embodiment of FIGS. 4 and 5, with at least an upper bracket 46 being secured to the accelerator pedal 12' for engaging the top tab. The lower tab 52' then holds the attachment in place behind pedal 12', and the bottom bracket, 46', is optional. However, two parallel brackets, receiving parallel tabs, render the construction more rigid. If only a single bracket and tab combination is used, the location of the upper tab (tab 52) is preferred because of the greater leverage secured thereby.

In the embodiment of FIGS. 4 and 5, as well as in the previous embodiments, the extension 16' or 16, as the case may be, extends upwardly and to the right from shaft member 10' or 10, as illustrated in FIGS. 1, 4, and 6. The extension thus has an angular attitude matching the angularity of the usual vehicle accelerator pedal, so that the extension 16' or 16 may be located along the left-hand side of a vehicle accelerator pedal. If the angle of the extension 16' or 16 does not entirely match that of a particular vehicle accelerator pedal, the extension may, of course, be bent after manufacture to the exact angle. The angularity of extensions 16 or 16' causes the tabs (18, 20, 52, and 52') to slant downwardly toward the floor from extension 16 or 16', and the weight of the device aids in retaining the attachment in engagement with the vehicle's accelerator pedal. This is particularly true in the case of the embodiment of FIGS. 4 and 5 where tabs 52, and/ or 52, prevent unintentional removal of the attachment away from the vehicle's accelerator pedal. Thus, the attachment must be upraised from the floor slightly for removing the tabs from brackets 46 and/or 46'.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:
1. In combination with a vehicle having a floor board and a conventional accelerator pedal angularly movable with respect to the floor board and having front and rear surfaces, an auxiliary accelerator attachment comprising:
 (a) an elongate shaft member extending transversely of said floor board to the left of said vehicle accelerator pedal and self-supported on the floor board by its weight,
 (b) an upward angular extension of said shaft member at the left of said vehicle accelerator pedal,
 (c) a first transverse tab carried by said extension at the end remote from said shaft member and extending to the right of said extension and in sliding engagement with the front surface of the vehicle accelerator pedal during use of said attachment, with that portion of the rear face of said accelerator pedal opposite to the portion in engagement with the tab being free and clear of any structure which would inhibit rearward movement of the accelerator pedal away from the tab,
 (d) a second transverse tab carried by said angular extension, spaced from said first transverse tab and located between said first transverse tab and said shaft member and extending to the right in sliding engagement with the rear face of said vehicle accelerator pedal, with that portion of the front face of said accelerator pedal opposite to said second transverse tab being free and clear of any structure which would prevent forward movement of said accelerator pedal away from said second transverse tab,
  said spaced tabs, one engaging the front face and the other the rear face of said accelerator pedal constituting the entire structure which positions the attachment on the accelerator pedal, with the second transverse tab functioning as a fulcrum for said first transverse tab when said shaft member is rotated, and
 (e) an auxiliary accelerator pedal at the end of said shaft member remote from said angular extension and in angular relation to said floor board and operable upon angular movement relative to the floor board to rotate said shaft and thereby cause angular movement of the vehicle accelerator pedal the same as the angular movement of the auxiliary accelerator pedal.

2. The combination of claim 1 in which said tabs comprise metal plates secured to said angular extension.

3. The combination according to claim 1 further including a hooked sleeve slidably received on one of said tabs and configured when in position to engage the right hand side of said vehicle accelerator pedal.

4. The combination according to claim 1 wherein said auxiliary accelerator pedal has a longitudinal internal channel for receiving a left-hand accelerator member therewithin joined to said shaft, and wherein said left-hand accelerator member rests on the floor board of said vehicle.

5. The combination according to claim 1 wherein said transverse shaft member comprises first and second shaft portions having flat longitudinal sides disposed in overlapping engagement, and clamping means comprising a pair of clamps removably securing said shaft members together so that said shaft members overlap to an adjustably selected extent for determining the overall length of said attachment and the location of said left-hand accelerator member.

6. The combination according to claim 1 wherein said tabs are of approximately equal length.

7. The combination according to claim 6 wherein said tabs extend at least half way across said accelerator pedal.

References Cited

UNITED STATES PATENTS

| | | | |
|---|---|---|---|
| 2,226,569 | 12/1940 | Martin | 74—562.5 |
| 2,658,411 | 11/1953 | Eversman | 74—562.5 |
| 2,764,037 | 9/1956 | Venditty | 74—562.5 |
| 2,829,539 | 4/1958 | Wilcox | 74—562.5 |
| 2,914,961 | 12/1959 | Ewer | 74—562.5 |
| 2,942,493 | 6/1960 | Barth | 74—562.5 |
| 3,199,369 | 8/1965 | Kaul | 74—562.5 |

FRED C. MATTERN, Jr., Primary Examiner

F. D. SHOEMAKER, Assistant Examiner